June 24, 1941.   W. W. DAVIDSON   2,246,508
FEEDING AND REGISTERING APPARATUS
Filed Sept. 18, 1937   7 Sheets-Sheet 6

Inventor:
William Ward Davidson
By Gillson Mann & Cox
Attys.

Fig.12

Patented June 24, 1941

2,246,508

UNITED STATES PATENT OFFICE 2,246,508

FEEDING AND REGISTERING APPARATUS

William Ward Davidson, Evanston, Ill.

Application September 18, 1937, Serial No. 164,546

30 Claims. (Cl. 271—53)

This invention relates to feeding apparatus for feeding sheets to any mechanism in which the position of the sheet must be accurately registered with the position of the mechanism. Since the most common instance of the need for accurate registry in sheet feeding is in connection with printing presses, the invention is illustrated and described in that relation and further references to other uses may be omitted for the sake of simplicity. However, the term "printing presses" may be taken as including related machines such as duplicators.

The most successful commercial feeding devices heretofore have been of the type in which the sheet was fed against a stationary gauge-stop and then advanced against a final gauge on the impression cylinder at which time it was seized by gripping fingers also carried by the impression cylinder of the press. Such gauge and gripping fingers on the cylinder have been considered necessary because of the unreliability of the registry which could be obtained in practice with the external feeding mechanism if the final gauge and grip fingers were not used. The presence of the gauge and grip fingers on the impression roll has necessitated the use of a platen roll of the same size provided with a recess to receive the projecting parts on the impression roll at each revolution.

An object of the present invention is to permit the elimination when desired of the gauge and grip fingers from the printing rolls and to provide a practical feeding mechanism which is so accurate and reliable that there is no need for additional gauge means. Thus the invention may be considered to lie both in the construction of the feeding mechanism and in the conception that the grip fingers and gauge can be omitted and a smaller platen roll used in spite of the firm beliefs to the contrary heretofore universal in the art.

In the illustrated form of the invention, the feeding mechanism includes a conveying table for conveying the sheet to the initial feeding position against a side guide and stationary stop gauge which accurately register it in this initial position. This method of registry is believed to be more satisfactory than attempting to register the sheet without stopping it, and furthermore uses more simple apparatus. While the sheet is stopped in this initial position, it is engaged by the advancing rollers which are at the moment stationary. The stop fingers are then moved away from the path of the sheet, being started simultaneously with or before the sheet and at such a speed as to keep out of the way of the sheet as it is advanced, so that they will not retard the starting of the sheet or mar its edge. The advancing rollers are slowly started and then move rapidly so that the inertia of the sheet will not cause any slippage, the sheet preferably having the speed of the printing cylinders at the time they seize it so that there will be no drag. The advancing rollers release the sheet as promptly as possible after it is seized by the printing cylinder. An important novel feature of the invention is that the driven advancing roller and its driving mechanism are then returned to their original positions in a manner to leave them free from backlash, the illustrated manner of accomplishing this being by means of a return spring acting on the driven advancing roller.

Additional objects of the invention will be apparent from the following description and from the drawings in which portions of the printing press and of the preliminary conveyor with which the invention has been illustrated are broken away and in which.

A preferred embodiment of the invention has been shown in the drawings and will hereinafter be described all as required by Section 4888 of the Revised Statutes, but the appended claims are not to be limited by the specific disclosure except as required by the prior art.

The invention has been illustrated in connection with a conveyor 1 for feeding successive individual sheets of paper to an offset rotary printing press 2. The conveyor 1 may include a plurality of belts 3, and a side guide 4. Although a jogger is not shown, one may be used if desired to insure proper side registry of each sheet. As illustrated, the belts 3 are inclined or biased slightly toward the side guide 4 so that the sheet will be urged against the guide 4 and have its lateral position accurately determined thereby. The printing press includes the platen roll 11, the impression or blanket cylinder 12, a plate cylinder not shown, which are driven in any suitable manner at the same peripheral speed as by gears 10 and suitable inking rolls. There may also be any other auxiliary features desired, such as a stripper 13, a delivery unit including, for example, roll 14 against which the sheet may be pressed by marbles, and a catch box 15.

Heretofore impression cylinders have been equipped with sheet gripping fingers which projected beyond the periphery of the cylinder. This has required that the platen roll be recessed to receive the projecting members, and since the recess must meet the impression cylinder at the same point during each revolution it has been necessary that the platen roll be the same size as the impression cylinder to make one revolution for each revolution of the impression cylinder. According to the present invention and because of the accurate feeding means described below, the gripping fingers may be omitted from the impression cylinder 12 as in the illustrated form. Furthermore, the blanket stretcher 15' and other blanket securing means are within the periphery of the cylinder so that there are no projecting parts anywhere in the periphery of the cylinder. The platen roller 11 therefore need not make one revolution to each revolution of the impression cylinder 12 and can therefore be made considerably smaller so that it will be lighter and cheaper than has heretofore been possible.

Figure 5:
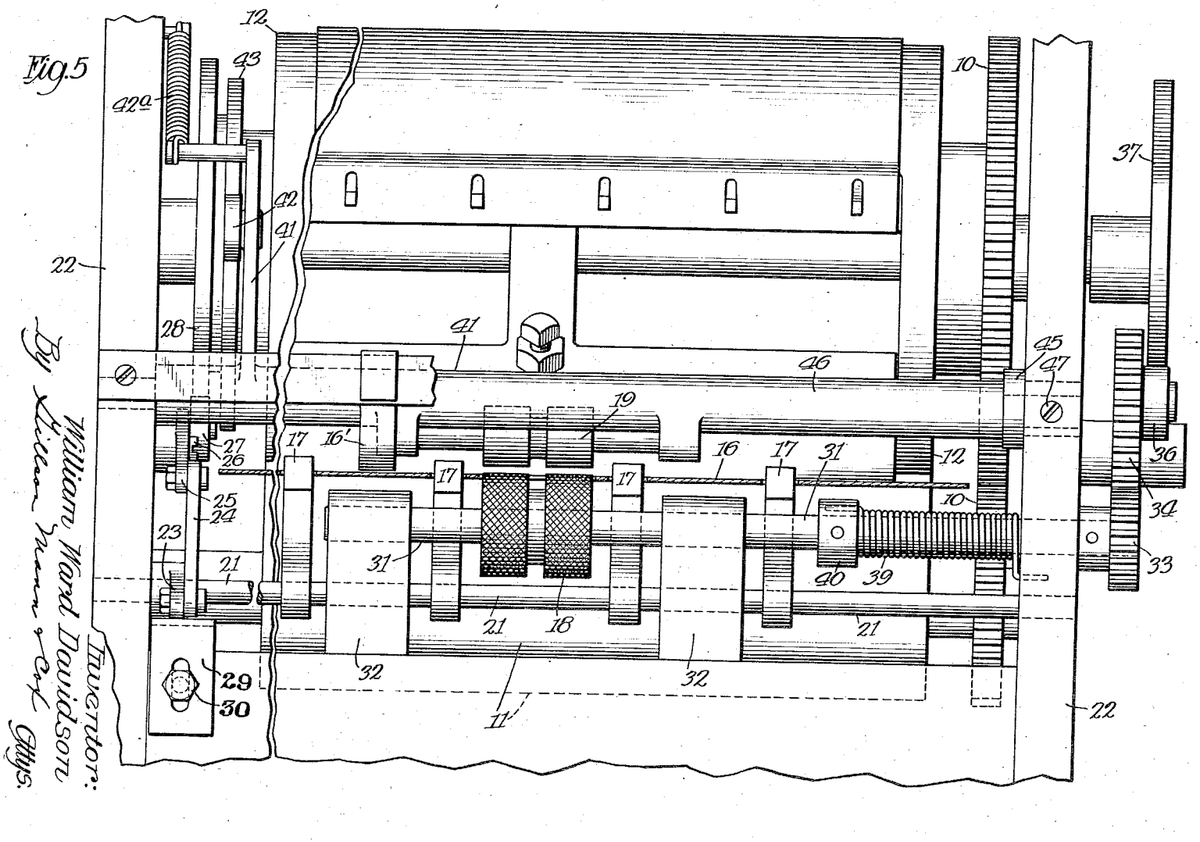
Fig. 5 is a fragmentary end elevation taken approximately on the line 5—5 of Fig. 4, the feed table 16 being shown in section.

The feed mechanism includes in addition to the conveyor 1 a feed table 16 onto which the belts 3 carry the sheets, the sheets being held flat on the table by spring fingers 16', and having their forward edges accurately stopped by stop fingers 17 or other gauge stops. They are then advanced by a driven feed or advancing roller 18 and pressure roller 19 cooperating with roller 18. The advancing rollers 18 and 19 are preferably double unitary rollers positioned near the center of the sheet as seen in Fig. 5. The mechanism for operating the feed elements 17, 18 and 19 comprises a major portion of this invention.

Stop fingers

Figure 3:
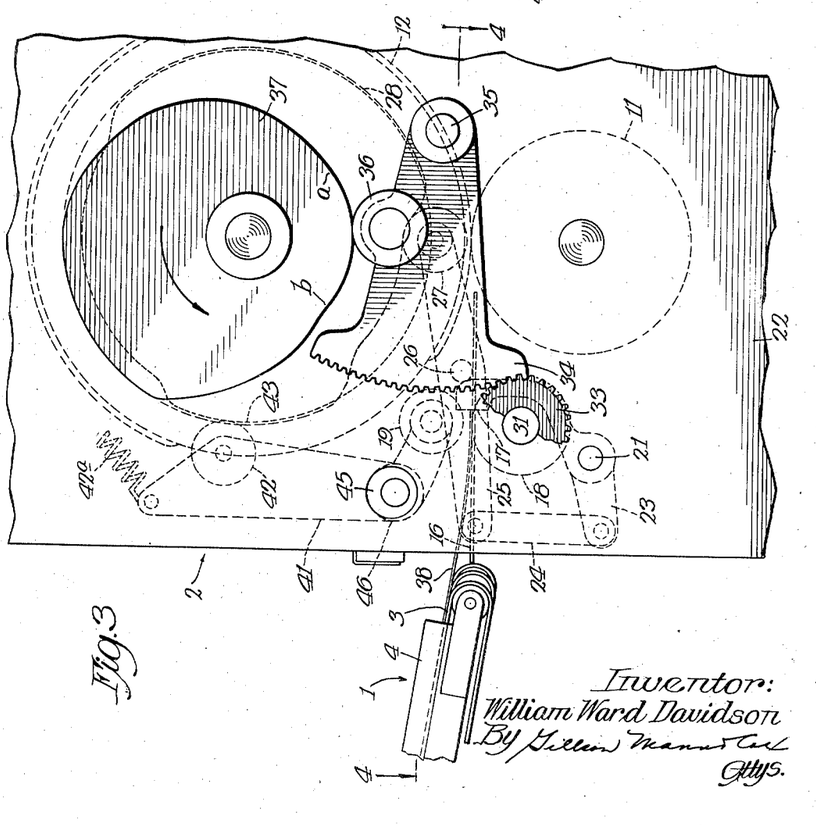
Fig. 3 is a fragmentary side elevation of the invention as illustrated in Fig. 1.
Figure 4:
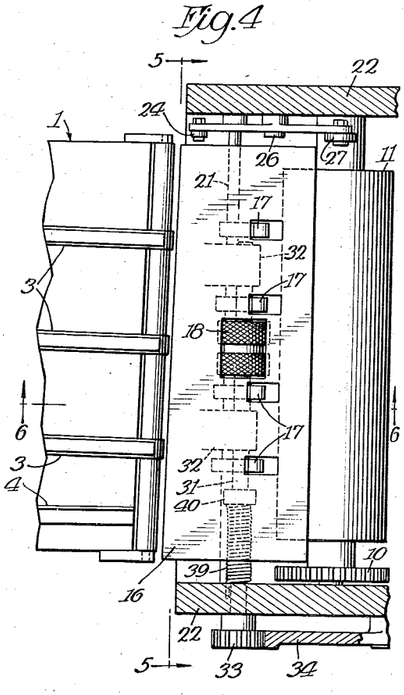
Fig. 4 is a fragmentary horizontal sectional view taken approximately on the line 4—4 of Fig. 3.
Figure 6:
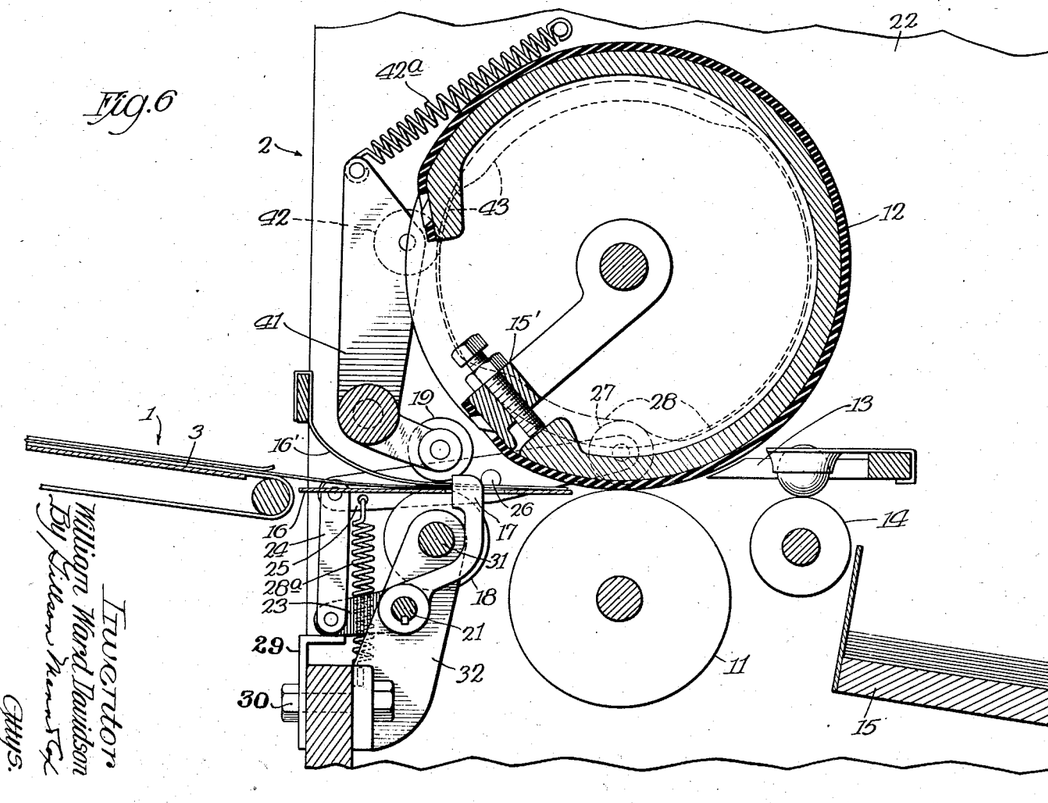
Fig. 6 is a vertical longitudinal sectional view taken approximately on the line 6—6 of Fig. 4.

The stop fingers 17 are carried by and keyed to a shaft 21, which as seen best in Fig. 3, is carried by the frame 22 of the printing press. Fig. 6 illustrates the paper stopping position of the stop fingers 17. They may be swung on the shaft 21 to an out-of-the-way position by operation of a crank lever 23 which turns shaft 21. The crank 23 is operated by link 24 which in turn is operated by lever 25 pivoted to the press frame 22 at 26 and bearing a cam follower roller 27 which rides on cam 28 under the influence of a spring 28a. The cam 28 is mounted to rotate with the cylinder 12, as are the other feed controlling cams, in order to insure accurate synchronization of the feeding with the impression cylinder. It is preferred not to have the cams merely geared to the impression cylinder since that would introduce one more chance for slight errors which might make the feeding unsatisfactory.

In order to feed paper accurately to a high-speed press it is desirable or necessary to utilize all the time available. Split seconds are important since the feeding means must be able to handle sheets of the maximum length and at the maximum speed for which the press is designed. Any minute time wasted while the sheet is stationary leaves that much less time for other parts of the feeding cycle and hence some step in the cycle may be less smooth than is desired for the sake of accuracy and dependability. According to the present invention the shaft 21 for the stop fingers is so positioned that the initial movement of these fingers will be almost in the direction of movement of the sheet. This permits starting the sheet at the same time the stop fingers are started, it being necessary only that the stop fingers move ahead as fast as the sheet until they are out of its line of movement, having disappeared below the sheet.

Drive mechanism for advancing rollers

The advancing roller 18 is keyed to a shaft 31 which is carried by the main frame 22 and bearing posts 32 thereon. Also keyed on the shaft 31 is a pinion 33, which is driven by a gear segment 34 pivoted to the frame at 35 and provided with a cam follower roller 36 engaging a cam 37 which rotates with the impression roll 12. A torsion spring 39 operates through a collar 40, shaft 31, gear 33 and gear segment 34 to press follower roller 36 against cam 37. It is evident that when the gear segment 34 is driven downwardly by the cam 37 it will turn the pinion 33 and the feed roller 18 in a direction to feed the sheet 38 forwardly. To prevent the inertia of the sheet 38 from causing slippage, the feed roller 18 is diamond knurled and the cam 37 is shaped to start the feed roller 18 gradually and accelerate it smoothly. The shape of the cam is seen best in the full lines of Fig. 12 and is discussed in detail hereinafter. The pressure roller is not driven but is made of a light construction and is trunnioned in anti-friction bearings so that it will start easily and will not have any material driving effect if it is still spinning slightly when it comes down onto the sheet. Furthermore, the pressure roller is a unitary member at the center of the sheet so that any forward force it exerts can not twist the sheet. In the prior art with a roller at each side of the sheet one might engage the sheet slightly before the other and twist the sheet.

Pressure roller control

The pressure feed roller 19 is rotatably carried by a bell crank structure 41 which is pivotally carried by the frame 22 and which carries a cam follower roller 42 at its upper end. The roller 42 engages cam 43 which operates to raise the pressure roller 19 and hold it up during the time that the sheet 38 is being fed onto the feed table 16 and to lower the roller 19 while the sheet is stopped by the stop fingers 17, the advancing roller 18 being stationary at this time also. It should be understood that the sheets are fed to the conveying table 1 in timed relation with the operation of the printing press by an automatic preliminary feeder. Such preliminary feeders are not sufficiently accurate to provide exact registration by themselves.

A spring 42a may be provided for urging roller 42 in contact with cam 43 and for pressing the pressure roll 19 in contact with the sheet when not held up by the cam 43. The cam is so shaped as to permit the pressure roller to engage the thinnest sheets and no adjustment is necessary for thicker sheets. It is very important that the pressure roller engage the sheet firmly while still stationary, in order that neither the thickness of the sheet nor slight unevenness of the grip of the advancing rolls will cause inaccurate feeding of the sheet. Unevenness of the grip of the advancing rolls is substantially eliminated by adjusting an eccentric bushing 45 to control the position of shaft 46 in the bell crank structure 41 carrying pressure roll 19. Bushing 45 may be locked in its proper position by set screw 47.

Modified stop fingers

Figure 1:
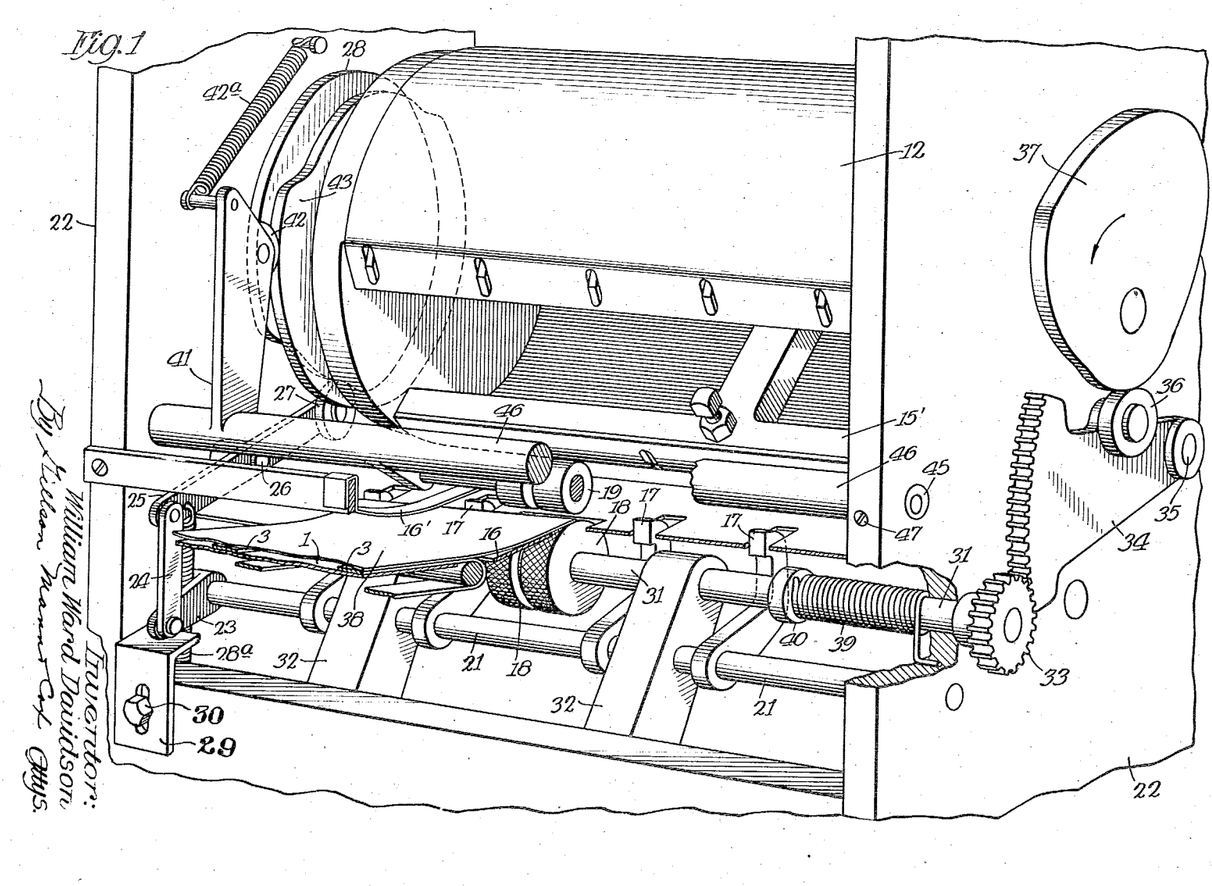
Fig. 1 is a perspective view of one form of the invention chosen for illustration with parts broken away for the sake of clarity.
Figures 2, 2A:
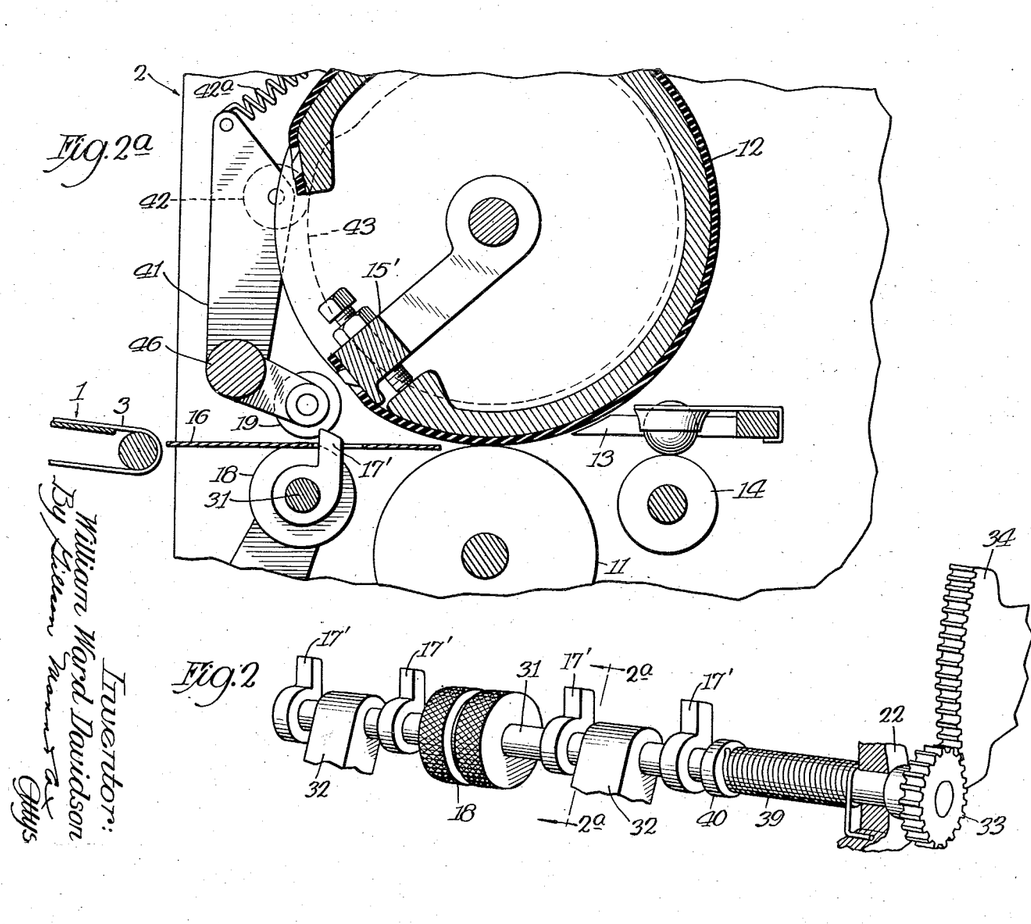
Fig. 2 is a fragmentary view corresponding to a portion of Fig. 1 but showing a simplified mounting of the stop fingers.
Fig. 2a is a sectional view taken on the line 2a—2a of Fig. 2 and showing related structure as well.

In Figs. 2 and 2a a simplified form of the invention has been illustrated in which the mechanism for operating the stop fingers 17 has been omitted. According to this modification, the stop fingers 17' are carried by shaft 31 of the advancing roller 18. These stop fingers may have the same position as those illustrated in the other figures. No special mechanism need be provided for operating them, however, since they are rotated with the shaft 31 when it is rotated by cam 37, gear segment 34 and pinion 33 to rotate the advancing roller 18 as previously described.

This arrangement provides the same accuracy of registration obtained by the construction shown in the other figures with the utmost simplicity. The stationary advancing rollers engage the sheet while the sheet is held in an accurately predetermined position by the stop fingers 17'. The thickness of the sheet makes no difference as to the time at which the sheet is advanced and there is no danger that uneven advancing rolls will engage one side of the sheet before they engage the other and hence twist the sheet. Since the stop fingers move with the advancing rollers there is no delicate adjustment necessary to start the advancing rollers as soon as possible without starting them before the stop fingers move.

Operation

Figures 7, 8, 9, 10, 11:
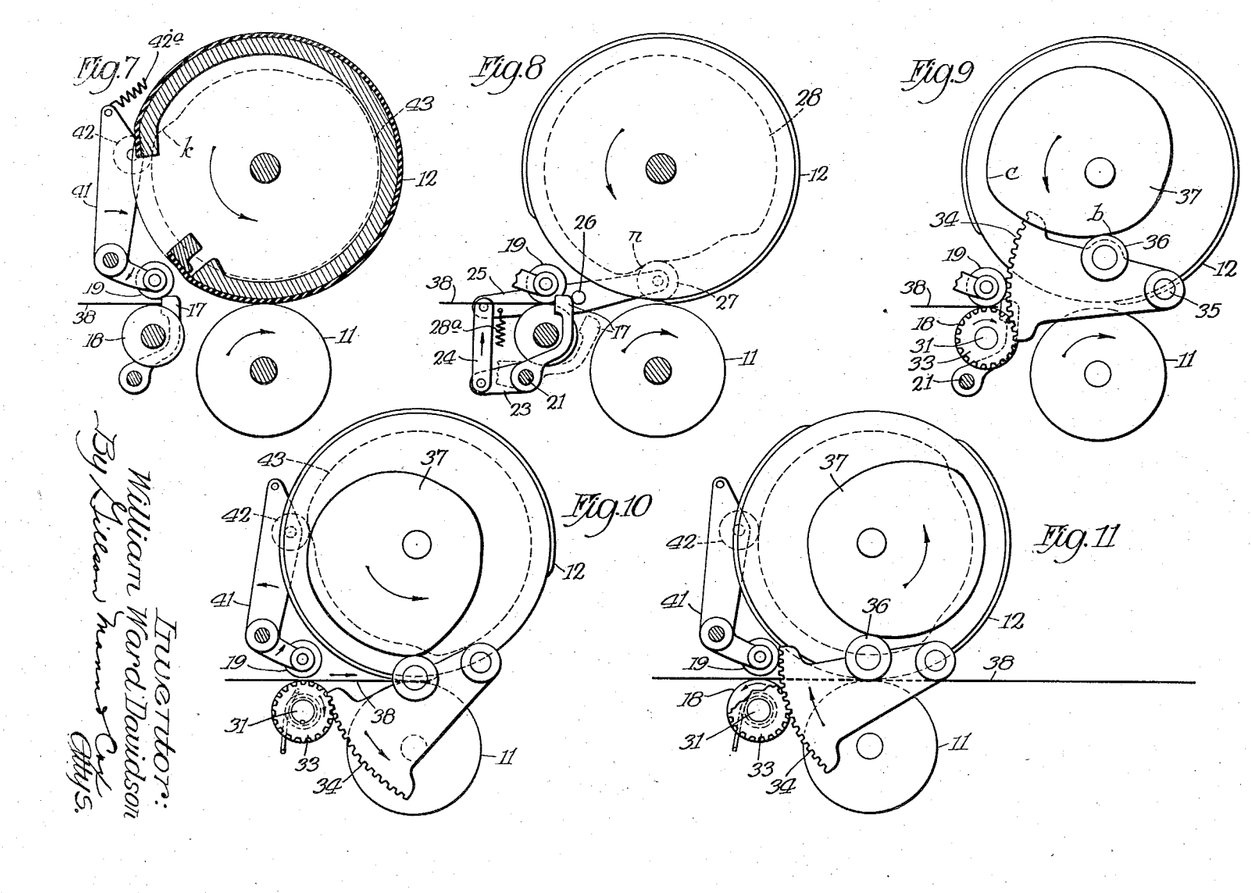
Figs. 7 to 11 are diagrammatic views showing the positions of the parts in successive steps in the operation of the apparatus.

The parts may be considered to be in their initial positions as shown in Figs. 3, 6 and 7, the sheet 38 being shown for the purpose of illustration as already fed by conveyor 1 against the stop fingers 17, the pressure roller 19 being held spaced above the paper by the enlarged dwell portion of cam 43 (see Fig. 7), and the feed roll 18 being held stationary by virtue of the fact that the follower 36 is resting on the reduced dwell portion a—b of the cam 37, as seen in Fig. 3.

Figs. 7 to 11 illustrate diagrammatically the various steps in the operation of the feeding mechanism each figure omitting parts not concerned with the step there illustrated. Fig. 7 shows the parts in the initial positions described in the preceding paragraph and indicates by arrows the first step, namely, the lowering of the pressure roll 19 after the sheet has been fed between it and the advancing roller 18 and has come to rest accurately positioned against the stop fingers 17. It will be observed that the receding portion k of the cam 43 is about to pass under the roller 42 so that the bell crank structure 41 will pivot as indicated by the arrow thereon and lower the roller into contact with the sheet 38 resting on advancing roller 18.

Fig. 8 indicates the operation of the mechanism for the next step in which the stop fingers 17 are moved out of the way. It will be observed that the inclined portion n of the cam 28 is about to press the roller 27 bearing thereon outwardly. This roller will pivot the lever 25 about the fixed pivot 26, thus drawing the link 24 upwardly and pivoting the crank 23 which rotates shaft 21 to which the stop fingers 17 are secured. The rotation of the shaft 21 in this manner swings the stop fingers 17 as indicated by the arrow thereon to the dotted line position. It will be observed that because of the position of the shaft 21 the stop fingers 17 swing away from the sheet somewhat in the direction of its movement so that the forward movement of the sheet may be started as soon as the stop fingers 17 have begun to move or preferably simultaneously with their initial movement to prevent any unnecessary loss of time.

The start of the advancing movement of the sheet is shown in Fig. 9 in which it may be noticed that the stop fingers 17 have already moved a safe distance ahead of the sheet although their movement is not yet complete and they need not move any faster than the sheet. The sheet is advanced by action of the cam 37 on follower roller 36. It will be observed in Fig. 9 that the inclined portion b—c of cam 37 has just reached roller 36 and is beginning to thrust roller 36 downwardly and with it the gear segment 34. The latter is rotating the pinion 33 keyed on shaft 31 which also carried the advancing roller 18. The shape of the cam 37, as seen best in Fig. 12, is such as to accelerate the roller 18 and the sheet 38 smoothly and rapidly, causing them to reach a speed at least close enough to the speed of the printing rolls 11 and 12 before the sheet enters the bite of these rolls to prevent slippage of the sheet in the bite.

The entry of the sheet 38 between printing cylinders 11 and 12 while moving at the same speed as the printing cylinders is indicated by Fig. 10. The cylinders 11 and 12 are surfaced with steel and rubber respectively and are normally positively pressed together (usually by a cam) sufficiently firmly to preclude any possibility of slippage of the sheet when it is fed to the rolls at a speed near to or greater than the peripheral speed of the rollers. It will also be observed in Fig. 10 that the inclined portion of the cam 43 is about to engage the roller 42 and press it outwardly thereby rotating the bell crank structure 41 in the direction of the arrow in Fig. 10 to raise the pressure roller 19, thus freeing the sheet 38 so that it may be drawn ahead by the printing rolls irrespective of the rotating action of the advancing rollers 18 and 19.

As indicated in Fig. 11, in which the pressure roller 19 has already been raised, the advancing roller 18 is now rotated in reverse direction by the coil spring 39, the return movement being permitted by virtue of the fact that the enlarged portion of the cam 37 is passing away from the roller 36. The coil spring 39 thus drives the gear segment 34 upwardly to maintain contact with cam 37.

Figure 12:
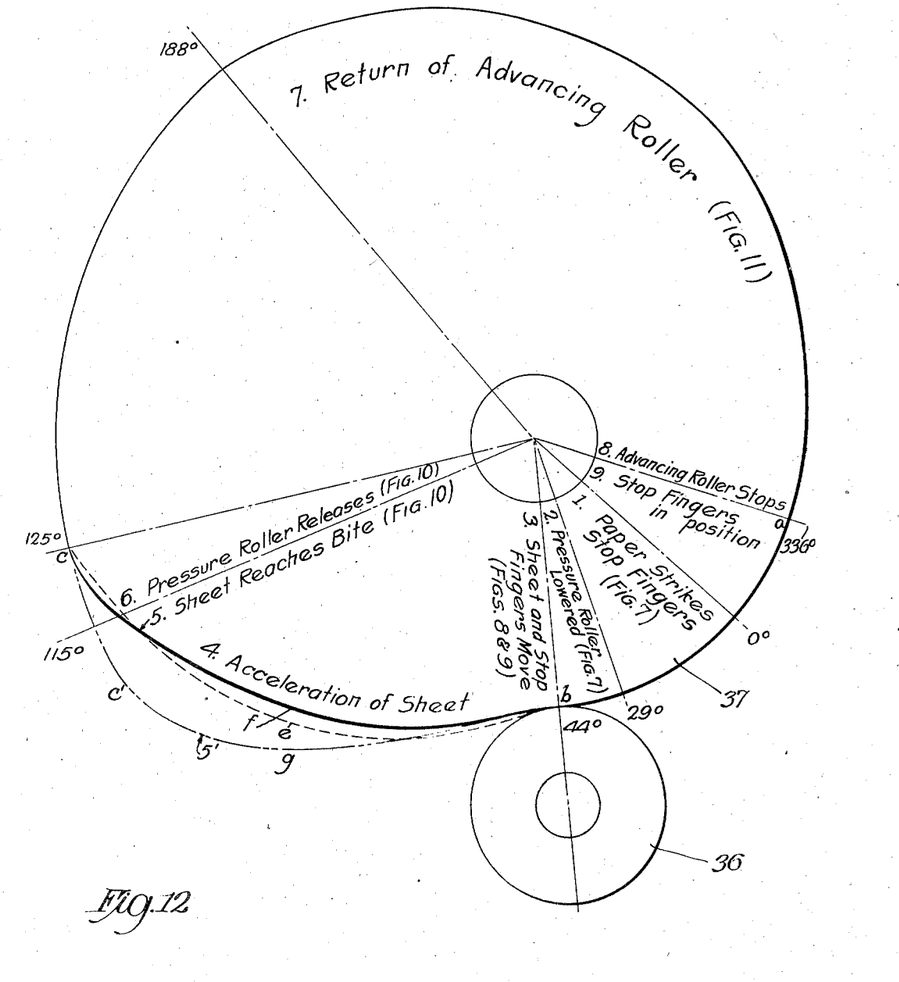
Fig. 12 is a detailed view of the driving cam, with dotted lines used in explaining the shape of the cam.

The sequence of operations may be made more clear by reference to Fig. 12. With the parts in the initial positions shown in Figs. 3 and 7 that portion of the cam marked "1. Paper strikes stop fingers" would be in contact with roller 36. The succeeding steps in the cycle and the portion of the cycle which is allotted to them is indicated by the successively numbered legends on the cam in Fig. 12. The angular extent of the divisions is noted, starting with zero at the initial side of the section referred to, but it should be understood that these angular extents are merely illustrative and are only given for such aid as they may be to anyone practicing the invention since the angles are subject to variation according to special circumstances or the preference of the designer, so long as the specific requirements elsewhere discussed are met. For example, the dwell portion a—b of the cam and particularly that portion thereof from the zero degree line to the point b should be just long enough to accomplish the feeding of the paper against the stop fingers and the lowering of the pressure roll onto the paper smoothly and reliably.

If the modified form of feeding mechanism shown in Fig. 2 is used, the operation is the same except that the step indicated in Fig. 8 is omitted, the stop fingers 17' being in this instance mounted on the shaft 31 carrying the advancing roller 18 so that the rotating of the roll 18 automatically carries the stop fingers 17' out of the way.

Freedom from backlash

Very minute differences in the positioning of the sheet with respect to the printing rolls 11 and 12 would make the feeding mechanism unsatisfactory. To avoid such minute errors, when the illustrated form of feeder is depended on for registration, it is necessary that the movement of the feed roll 18 be exactly the same in each instance. This means that the drive for this feed roll must be free from backlash which results in variations. Although backlash may be eliminated in a variety of ways, that which is believed the simplest and most reliable is illustrated. The torsion spring 39 is positioned to act directly on advancing roller 18 in the sense of acting on shaft 31 which may be considered a part of the advancing roller in this connection since they rotate together. Spring 39 always urges the advancing roll 18 in a reverse direction, thus taking up all slack and furthermore returning the roller 18 to its original position after each operation. When the inclined portion of the cam 37 presses the follower roller 36 downwardly, the force is applied in opposition to the continuing force of the spring and hence there is no backlash or slack to be taken up. The tension of the spring 39 should be sufficient to hold the segment 34 and its roller 36 against the cam 37 at all times, thus returning the advancing roller 18 to its initial position with whatever speed may be necessary for the fastest press operation to be encountered.

Accuracy of registration

Besides the freedom from backlash there are other features which contribute toward accuracy of registration of the sheet on the impression cylinder 12. The control of the feeding mechanism by cams mounted directly on the impression cylinder 12 or its shaft has already been mentioned as have the features of having stationary advancing rollers 18 and 19 in firm engagement with the sheet while it is accurately positioned against the stop fingers 17 and starting the sheet slowly to avoid slippage. In order that the movement of the sheet may be exact it is also preferred that both of the advancing rollers 18 and 19 and particularly the driven roller 18 be made of steel whereby they will be free from the variations which were likely to be encountered with resilient and less durable rollers of the past. The fact that these rollers are made of steel attaches more importance to the feature of starting the sheet slowly, so that there will be no slippage between the sheet and the rollers. It is not desirable to have the pressure between the advancing rollers very great, partly because such pressure might mar the sheet and partly because it is desirable to have the advancing rollers grip the sheet less firmly than it is gripped by the printing cylinders, so that once the sheet passes into the bite between the printing cylinders it will not slip with respect thereto but, if necessary, will slip with respect to the advancing rollers. Although the ideal condition is for the advancing rollers and the printing rollers to be rotating at the same peripheral speed, the grip of the advancing rollers should be enough less firm than the grip of the printing rollers so that any inexactitude in meeting this ideal condition will not be harmful.

It may be said that there are two ultimate essentials in producing accurate registry of a sheet after it has been accurately positioned against the stops 17. One is that there be no variations from time to time in the advancing of the sheet, and the other is that at the time of the bite the sheet be moving sufficiently close to the speed of printing and be sufficiently unrestrained so that it may accommodate itself to the speed of the printing cylinders without slipping with respect thereto. The freedom from backlash and the mounting of the control cam on the impression cylinder shaft is of particular importance with respect to the first of these requirements.

Another factor which contributes to the accuracy of registration is the provision of an adjustable stop 29, held in its desired position by a bolt 30 for cooperation with the arm 23, which is rigidly attached to the shaft 21 carrying the stop fingers 17. The stop should be adjusted so that the arm 23 will rest upon the stop whenever the stop fingers 17 are in their operative position for receiving advancing sheets that are being fed to the press. Since the arm 23 is rigidly attached to the shaft 21, which in turn is rigidly attached to the stop fingers 17, the stop 29 makes it possible to fix with extreme accuracy the gauge position of the stop fingers.

It is obvious, of course, that when the arm 23 strikes the stop 29 the follower 27, associated with the cam 26, will be lifted a slight distance from its operating surface, but the movement is so slight that it does not detract from the smooth operation of the machine.

The adjustable stop 29 is also preferably used with the gauge and stop means shown in Figs. 2 and 2ᵃ, with the arm 23 being attached to the portion of the shaft 31 that is not shown at the left side of the drawing. With this arrangement the follower 36, associated with the cam 37, will leave the surface of the cam by a slight amount when the arm 23 rests on the stop.

The stop makes it possible to compensate for wear in obtaining accurate positioning of the stop fingers.

Shape of drive cam

The sufficient speed of the sheet is acquired by properly shaping the cam. The point 5 on the cam 37 in Fig. 12 represents the point of the cam which will be in contact with the follower roller 36 when a sheet of a given thickness reaches the bite of the rolls. The difference between the radius of the cam at this point and the radius at the point 3 represents the approximate amount that the follower 36 must be thrust downwardly by the cam to move the sheet to the bite in the absence of slippage or other variations. The slope of the cam surface at this point 5 determines the speed of the advancing rollers 18 and 19 at the time of the bite, and hence determines the speed of the sheet if there is no slippage. If the cam were shaped to provide uniform speed it would follow the spiral curve b—e—c. Such a shape, however, is not as desirable as the curve b—f—c since the inertia of the sheet tends to prevent it from being instantaneously started at this speed. Accordingly, the cam is shaped with a curve b—f—c which starts off much less steeply than the curve b—e—c so as to start the sheet gradually. The portion of the curve at the point 5 is steeper than the curve b—e—c and its ideal slope is such as to move the sheet at exactly the peripheral speed of the impression cylinder. A cam having approximately the shape of the curve b—f—c has been found to be satisfactory.

The curve b—g—5'—c' represents a type of shape which could be used advantageously if it were necessary to feed the sheet more quickly than it is fed by the curve b—f—c, as, for example, if printing presses should be designed to run the sheets closer together than is now the practice. The portion of the curve b—g represents the accelerating portion of the cam during which the steepness of the curve constantly increases so that at all times the acceleration of the sheet is the maximum which may be found safely consistent with the avoidance of slippage. The maximum acceleration may be a little faster after the sheet has started than in starting it. At approximately the position g the slope of the curve is so steep that the sheet is being fed faster than the printing speed, and therefore to provide ideal conditions at the time of the bite, i. e., at the position 5', the curve should have a reducing slope from the point g approximately to the point 5'.

From approximately the point 5' to the point c' the curve should be of substantially the same shape as the curve b—f—c from approximately the point 5 to the point c. In the vicinity of the points 5 and 5' and specifically throughout the zone at which the bite will occur with different thicknesses of sheets which are likely to be run, the ideal condition is for the curve to be a spiral having a slope which will cause the sheet to move at exactly the printing speed. This will avoid variations in registry due to thickness of the sheets. Commercial approximations of this ideal will ordinarily be entirely satisfactory, however, and in instances where very slight variations if different thicknesses of sheet were used in different runs would not be objectionable, it is merely necessary that the speed of the sheet be sufficiently high so that there will be no slippage between it and the impression cylinder. As the curves approach the points c or c' respectively their shapes cease to affect the registration since the pressure roller will have released, it being understood of course that if the curve b—g—c' were used the cam 43 would be correspondingly changed. Therefore, it is desirable that this final portion of the curve taper off so as not to attempt to stop the advancing roller 18 too suddenly or to cause the follower 36 to leave the cam because of the momentum of the parts.

From the foregoing it is evident that a sheet of paper will be accurately positioned between the stationary rollers 18 and 19 which will grip the paper before any movement which might result in inaccuracy and will then start the paper gradually and accelerate it smoothly under the influence of cam 37 until it reaches the exact speed of the periphery of printing rolls 11 and 12. Since the sheet was initially properly positioned and since it is driven an exactly predetermined amount before it is seized by the printing rolls 11 and 12 at which time it has already been smoothly accelerated to their speed, the grip fingers heretofore provided on the impression platen roll 12 need not be used, and accurate registration is assured without them. The thickness of the paper does not affect the feeding and hence the machine may be adjusted at the factory and no further adjustments need be made of the feeding mechanism. A sufficient time is allowed to feed the sheets to the stop fingers without unreasonable accuracy in timing their initial feeding, and yet time is so conserved that the rest of the cycle may be performed smoothly even if the press is run at its maximum speed and even if maximum sheet lengths are used leaving the minimum time between sheets for stopping and accelerating them.

I claim:

1. The combination of a machine including a pair of operating rolls and feeding means for feeding a sheet thereto in accurate registry with one of said rolls including a pair of advancing rollers; gauge stop means; means for feeding a sheet to the stop means and between the advancing rollers; means for moving the stop means and driving at least one advancing roller to cause the sheet to reach a speed equal to that of the operating rolls by the time it is fed thereto; control means for separating the advancing rollers while the sheet is fed thereto, causing them to grip the sheet while they are stationary and separating them to release the sheet while they are rotating with at least as great peripheral speed as the operating rolls and after the sheet has been seized by the operating rolls; and return means acting constantly on a member rigid with the driven advancing roller to return it to its original position after the rollers are separated and to avoid backlash in the drive therefor.

2. The combination of a printing press including a pair of printing members in rolling engagement to form a bite therebetween and feeding means for feeding a sheet to the bite in accurate registry with one printing member, including a pair of advancing rollers, gauge stop means, means for feeding a sheet between the rollers to the stop means, means for moving the stop means and driving at least one advancing roller to cause the sheet to reach a speed equal to the speed of the printing members by the time it is fed thereto, control means for separating the advancing rollers while the sheet is fed to the stop means, causing them to grip the sheet while they are stationary and separating them to release the sheet while they are rotating with at least as great peripheral speed as the printing members and after the sheet has been seized in the bite, and return means acting constantly on a member rigid with the driven advancing roller to return it to its original position after the rollers are separated and to avoid backlash in the drive therefor; the other advancing roller rotating freely but being of light construction whereby its momentum is too low to affect the sheet as this roller first engages the sheet.

3. The combination of a printing press including a pair of printing members in rolling engagement to form a bite therebetween but each free from sheet gripping mechanism, and feeding means for feeding a sheet to the bite in accurate registry with one printing member, including a pair of advancing rollers, gauge stop means, means for feeding a sheet between the rollers to the stop means, means for moving the stop means and driving at least one advancing roller to cause the sheet to reach a speed equal to the speed of the printing members by the time it is fed thereto, control means for separating the advancing rollers while the sheet is fed to the stop means, causing them to grip the sheet while they are stationary and separating them to release the sheet while they are rotating at least as fast as the printing members and after the sheet has been seized in the bite, and return means acting constantly on a member rigid with the driven advancing roller to return it to its original position after the rollers are separated and to avoid backlash in the drive therefor.

4. The combination of a printing press including a pair of printing rolls each free from sheet gripping mechanism but rotating together to form a bite therebetween and means for feeding the sheet to the bite in accurate registry with one printing roll including gauge stop means adapted to move partly in the direction of feeding and advancing rollers; cam means mounted with said one printing roll and in constant angular relationship therewith for driving at least one roller and controlling the stop means; a spring acting on a member rigid with the driven roll to return it and keep it free from backlash; roller separating means operating in timed relation with the printing rolls; and means for feeding a sheet against the stop; the cam means and separating means first holding the rollers separated while the sheet is fed against the stops, then causing the rollers to grip the sheet firmly before starting to rotate, thereafter substantially simultaneously starting to move the stop fingers out of the way and to rotate the rollers, moving the stop fingers sufficiently fast to keep them ahead of the sheet while in its line of movement, accelerating the sheet smoothly to a speed at least equal to that of the printing rolls by the time it reaches the bite and separating the rollers while they are maintained at a speed at least as great as the speed of the printing rolls.

5. The combination of moving printing members each free from sheet gripping mechanism but rotating together to form a bite therebetween, and means for feeding successive sheets directly to this bite and in accurate registry with a given line on one of the printing members on different revolutions thereof, including means for accurately positioning the sheet stationarily in a predetermined preliminary position and means for starting it after engaging it initially stationarily, accelerating its movement to the speed of the printing members, and, while moving it at substantially exactly this speed, causing it to pass into the bite.

6. Apparatus for feeding sheets in accurate registry to a moving operating device including a pair of advancing rollers initially separated, a gauge stop means mounted rigidly with one of the rollers which is initially stationary, means for feeding a sheet against the gauge stop means, means to cause the rollers to engage the sheet while it is still stationary, driving means for thereafter causing the rollers and gauge stop means to rotate, to move the sheet at least as fast as the speed of the operating device when it is seized thereby, and means for maintaining the driving means free from backlash.

7. Apparatus for feeding sheets in accurate registry to a moving printing device including a pair of advancing rollers initially separated, gauge stop means mounted for joint rotation with one of the rollers which is initially stationary, means for feeding a sheet against the gauge stop means, means to cause the rollers to grip the sheet while it is still stationary, and driving means for thereafter jointly rotating said roller and stop means for advancing the sheet and moving the stop means out of the way simultaneously.

8. The combination of a printing roll and means for feeding a sheet thereto in accurate registry therewith including gauge stop means, means for feeding a sheet against the stop means, advancing rollers adapted to grip the sheet while it engages the stop means and to feed it to the printing roll, and means for moving the stop means substantially simultaneously with the initial forward movement of the sheet by the advancing rollers but with a movement at least as fast in the direction of movement of the sheet as the movement of the sheet whereby the gauge does not obstruct the sheet when it is moved by the advancing rollers.

9. The combination of a printing roll and means for feeding a sheet thereto in accurate registry therewith including gauge stop means, means for feeding a sheet against the stop means, advancing rollers adapted to grip the sheet firmly while they are stationary and while it engages the stop means and to feed it to the printing roll, and means for substantially simultaneously starting the stop means and smoothly and rapidly starting the advancing rollers in a forward direction and for moving the stop means at least as fast in the direction of movement of the sheet as the movement of the sheet whereby the gauge does not obstruct the sheet when it is moved by the advancing rollers.

10. The combination of a printing roll and means for feeding a sheet thereto in accurate registry therewith including means for obtaining lateral registration, gauge stop means, means for feeding a sheet against the stop means and means for accelerating the sheet to the speed of the printing roll in as small a portion of the cycle of operation as is consistent with dependable accuracy including advancing rollers adapted to grip the sheet firmly while they are stationary and while it engages the stop means and to feed it to the printing roll and means for substantially simultaneously starting the stop means and smoothly and rapidly starting the advancing rollers in a forward direction and for moving the stop means at least as fast in the direction of movement of the sheet as the movement of the sheet whereby the gauge does not obstruct the sheet when it is moved by the advancing rollers.

11. The combination of an offset press including a blanket and platen rolls each free from sheet gripping mechanism but rotating together to form a bite therebetween, and means for feeding successive sheets directly to this bite and in accurate registry with the same line on the blanket roll in different revolutions thereof including means for accurately positioning the sheet stationarily in a predetermined preliminary position, and means for starting it after engaging it initially stationarily, accelerating its speed of movement to that of the blanket roll and, while moving it at at least substantially this speed, causing it to pass into the bite.

12. The combination of a printing press including two printing members in rolling engagement to form a bite therebetween and means for feeding a sheet in accurate registry therewith, including means for registering the sheet laterally, means for stopping the sheet in a longitudinally registered position, a driven advancing roller, means for driving it to advance the sheet to the bite in accurately timed relation therewith and for stopping the driven roller, and light idler pressure roller means, and means for moving the pressure roller away from the driven roller and causing it to press the sheet against the driven roller; the entire pressure roller means being positioned approximately at the center of the sheet whereby any rotary momentum it may have when initially engaging the sheet will not twist the sheet.

13. The combination of a printing press including a pair of printing members in rolling engagement to form a bite therebetween and feeding means for feeding a sheet to the bite in accurate registry with one printing member, including a pair of advancing rollers, gauge stop means, means for feeding a sheet between the rollers to the stop means, means for moving the stop means and including a cam, a gear segment riding on the cam, and a pinion driven by the gear segment for driving at least one advancing roller to cause the sheet to reach a speed substantially equal to the speed of the printing members by the time it is fed thereto, control means for separating the advancing rollers while the sheet is fed to the stop means, causing them to be in firm engagement with the sheet while they are stationary and separating them to release the sheet while they are rotating at least substantially as fast as the printing members and after the sheet has been seized in the bite, and a return spring acting constantly on the driven advancing roller to return it to its original position after the rollers are separated and effective through the pinion to urge the gear segment against the cam, thus avoiding backlash.

14. Apparatus for feeding sheets in accurate registry to one of a pair of printing members in rolling engagement, one of which is in the form of a roll and carries the printing impression, said apparatus including a pair of advancing rollers initially separated, gauge stop means positioned intermediate the rollers and the printing members, means for feeding a sheet against the gauge stop means, means to cause the rollers to engage the sheet while it is still stationary, means for thereafter moving the stop means from sheet stopping position, and causing the rollers to rotate to move the sheet into the bite between the printing members, said last named means including a cam on the impression roll and a drive from the cam to one of the rollers, and means for maintaining the drive free from backlash.

15. Apparatus for feeding sheets in accurate registry to one of a pair of rolls rotating together to form a bite therebetween including means for accurately positioning the sheet stationarily in a predetermined preliminary position, and means for gripping the sheet while it is still stationary, starting it at a speed sufficiently low to avoid slippage, accelerating its movement to a speed in excess of the speed of the rolls, and, while moving it at substantially the exact speed of the rolls, causing it to enter the bite and thus be seized by the rolls.

16. Apparatus for feeding sheets in accurate registry to one of a pair of printing members in rolling engagement to form a bite therebetween including means for accurately positioning the sheet stationarily in a predetermined preliminary position, advancing rollers for gripping the sheet while it is still stationary, and driving means for at least one of the advancing rollers including a cam rotated in constant relationship to one of the printing members, a follower, and gear means driven by the cam and follower, the cam having successively a dwell portion engaging its follower while the sheet is fed and gripped by the rollers, an accelerating portion of increasing steepness at all times substantially as steep as it can be without danger of causing slippage of the rollers on the sheet, a transferring portion engaging the follower at the time when the sheet reaches the bite and having a slope which will cause the rollers to have a momentarily substantially constant peripheral speed substantially corresponding to the speed of the printing members, a decelerating portion of decreasing slope for stopping the roller, and a receding portion for returning the roller to its original position.

17. Apparatus for feeding sheets in accurate registry to a printing device including a pair of advancing rollers initially separated, a drive shaft on which one of the rollers is mounted, a plurality of stop fingers mounted on the drive shaft on opposite sides of the roller and initially positioned to stop a sheet between the separated rollers, means for feeding a sheet against the stop fingers, means to cause the rollers to grip the sheet while it is still stationary, and driving means for thereafter driving the shaft to start the roller and stop fingers thereon simultaneously.

18. Apparatus for feeding sheets in accurate registry to one of a pair of rolls rotating together to form a bite therebetween including feeding rollers and means for rendering the feeding rollers effective to advance a sheet to the bite in registry with the rolls and approximately at their speed, the gripping of the rolls being sufficiently firm to seize the sheet without perceptible slippage, and the grip of the feeding rollers being sufficiently gentle and smooth to permit the sheet to slip with respect thereto without injury as it is seized by the rolls.

19. The combination of an impression cylinder free from sheet gripping mechanism and from other protruding parts, a platen roll smaller than the cylinder rotating therewith to form a bite and having a uniform surface, and means for feeding sheets directly to this bite in accurate registry with the cylinder including means for accurately positioning the sheet stationarily in a predetermined preliminary position, means for starting it after engaging it initially stationarily, accelerating its movement substantially to the speed of the cylinder, and, while moving it at at least substantially this speed, causing it to pass into the bite.

20. Apparatus for feeding sheets in accurate registry to one of a pair of printing members in rolling engagement, one of which is in the form of a roll and carries the printing impression, said apparatus including a feed table, spring fingers for holding a sheet flat on the feed table, a pair of advancing rollers initially separated, gauge stop means positioned intermediate the rollers and the printing members, means for feeding a sheet between the feed table and spring fingers and against the gauge stop means, means to cause the rollers to engage the sheet while it is still stationary, means for thereafter moving the stop means from sheet stopping position, and causing the rollers to rotate to move the sheet into the bite between the printing members, said last named means including a cam on the impression roll and a drive from the cam to one of the rollers, and means for maintaining the drive free from backlash.

21. Apparatus for feeding sheets in accurate registry to one of a pair of printing members in rolling engagement, one of which is in the form of a roll and carries the printing impression, said apparatus including a feed table, a pair of advancing rollers initially separated, gauge stop means positioned intermediate the rollers and the printing members, means associated with the feed table for feeding a sheet from the feed table against the gauge stop means in desired lateral registry, means to cause the rollers to engage the sheet while it is still stationary, means for thereafter moving the stop means from sheet stopping position initially in approximately the direction of sheet movement and causing the rollers to rotate forwardly at approximately the same time to move the sheet into the bite between the printing members at substantially the exact speed of said printing members, said means being effective to feed one sheet for each revolution of the printing member.

22. Apparatus for feeding sheets in accurate registry to one of a pair of rolls rotating together to form a bite therebetween including a pair of advancing rollers initially separated, a gauge stop means mounted between the advancing rollers and the moving operating device, means rigid with the stop means for fixing their operative sheet stopping position, means for feeding a sheet against the gauge stop means, means to cause the rollers to engage the sheet while it is still stationary, and means for thereafter causing the rollers to rotate and simultaneously move the gauge stop means from the path of the advancing sheet with a movement initially approximately in the direction of the sheet movement.

23. Apparatus for feeding sheets in accurate registry to one of a pair of rolls rotating together to form a bite therebetween including a pair of advancing rollers initially separated, a gauge stop means mounted between the advancing rollers and the moving operating device, adjustable means including means rigid with the stop means for fixing their operative sheet stopping position, means for feeding a sheet against the gauge stop means, means to cause the rollers to engage the sheet while it is still stationary, and means for thereafter causing the rollers to rotate and simultaneously move the gauge stop means from the path of the advancing sheet with a movement initially approximately in the direction of the sheet movement.

24. Apparatus for feeding sheets in accurate registry to one of a pair of printing members in rolling engagement to form a bite therebetween including means for accurately positioning the sheet stationarily in a predetermined preliminary position, advancing rollers for gripping the sheet while it is still stationary, and driving means for at least one of the advancing rollers including a cam rotated in constant relationship to one of the printing members, a follower, and gear means driven by the cam and follower, the cam having successively a dwell portion engaging its follower while the sheet is fed and gripped by the rollers, an accelerating portion of increasing steepness at all times substantially as steep as it can be without danger of causing slippage of the rollers on the sheet and reaching a peak acceleration which makes the peripheral speed of the rollers greater than the peripheral speed of the printing members, a decelerating portion which brings the peripheral speed of the rollers down to the peripheral speed of the printing members, a transferring portion engaging the follower at the time when the sheet reaches the bite and having a slope which will cause the rollers to have a peripheral speed substantially corresponding to the speed of the printing members, a decelerating portion of decreasing slope for stopping the roller, and a receding portion for returning the roller to its original position.

25. The combination of an impression cylinder and a platen roll forming a bite, the impression cylinder being free from parts protruding toward the platen roll, and the platen roll being substantially smaller than the impression cylinder, and means for feeding sheets directly to this bite in accurate registry with the cylinder for each revolution thereof, including a feed roll positioned closer than the radius of the cylinder to the axis of the platen, a pressure roll initially separated from the feed roll, means for feeding and laterally registering a sheet between said last named rolls, stop fingers positioned to register the sheet just as it comes between the feed roll and pressure roll, means for causing the pressure roll to press the sheet against the feed roll while these rolls are stationary, and means acting identically with each revolution of the cylinder for thereafter rotating the feed roll and moving the stop fingers out of the way with a movement initially in the direction of movement of the sheet and subsequently on the side of the sheet toward the platen, said means accelerating the sheet smoothly to the surface speed of the cylinder at the time it reaches the bite, and guide means for preventing the sheet from buckling between the feed roll and the bite.

26. The combination of an impression cylinder and a platen roll forming a bite, the impression cylinder being free from parts protruding toward the platen roll, and means for feeding successive sheets directly to this bite in accurate registry with a given line on the cylinder for different revolutions thereof, including a feed roll, a pressure roll initially separated from the feed roll, means for feeding and laterally registering a sheet between said last named rolls, stop fingers positioned to register the sheet just as it comes between the feed roll and pressure roll, means for causing the pressure roll to press the sheet against the feed roll while these rolls are stationary, and means acting identically with each printing revolution of the cylinder for thereafter rotating the feed roll and moving the stop fingers out of the way, said means accelerating the sheet smoothly to the surface speed of the cylinder at the time it reaches the bite, and guide means for preventing the sheet from buckling between the feed roll and the bite.

27. The combination of an impression cylinder and a platen roll forming a bite, the impression cylinder being free from parts protruding toward the platen roll, and the platen roll being substantially smaller than the impression cylinder, and means for feeding sheets directly to this bite in accurate registry with the cylinder for each revolution thereof, including a feed roll positioned closer than the radius of the cylinder to the axis of the platen, a pressure roll initially separated from the feed roll, means for feeding and laterally registering a sheet between said last named rolls, stop fingers positioned to register the sheet between the feed roll and pressure roll, means for causing the pressure roll to press the sheet against the feed roll while these rolls are stationary, and means acting identically with each revolution of the cylinder for thereafter rotating the feed roll and moving the stop fingers out of the way with a movement initially in the direction of movement of the sheet and subsequently on the side of the sheet toward the platen, said means accelerating the sheet smoothly to the surface speed of the cylinder at the time it reaches the bite, and guide means for preventing the sheet from buckling between the feed roll and the bite.

28. The combination of an impression cylinder and a platen roll forming a bite, and means for feeding successive sheets to this bite in accurate registry with a given line on the cylinder for different revolutions thereof, including a feed roll, a pressure roll initially separated from the feed roll, means for feeding and simultaneously laterally registering a sheet between said last named rolls, stop fingers positioned to stop said sheet just as it comes between the feed roll and pressure roll, means for causing the pressure roll to press the sheet against the feed roll while these rolls are stationary, and means for thereafter simultaneously rotating the feed roll and moving the stop fingers out of the way with a movement initially in the direction of movement of the sheet, said means accelerating the sheet smoothly to the surface speed of the cylinder at the time it reaches the bite.

29. Apparatus for feeding sheets in accurate registry to one of a pair of printing members in rolling engagement, one of which is in the form of a roll and carries the printing impression, said apparatus including a feed table, a pair of advancing rollers initially separated, gauge stop means positioned intermediate the rollers and the printing members, means associated with the feed table for feeding a sheet from the feed table against the gauge stop means in desired lateral registry, means to cause the rollers to engage the sheet while it is still stationary, means for thereafter moving the stop means from sheet stopping position initially in approximately the direction of sheet movement and causing the rollers to rotate forwardly at approximately the same time to move the sheet into the bite between the printing members at substantially the exact speed of said printing members, said apparatus feeding successive sheets each to register with the same line on said one printing member on different revolutions thereof.

30. The combination of a printing roll and means for feeding a sheet thereto in accurate registry therewith including gauge stop means, means for feeding a sheet against the stop means, advancing rollers normally separated but adapted to grip the sheet adjacent the edge against the stop means while it engages the stop means and to feed it to the printing roll, and means for moving the stop means substantially simultaneously with the initial forward movement of the sheet by the advancing rollers but with a movement at least as fast in the direction of movement of the sheet as the movement of the sheet whereby the gauge does not obstruct the sheet when it is moved by the advancing rollers.

WILLIAM WARD DAVIDSON.